(12) United States Patent
Petersen

(10) Patent No.: US 10,476,390 B2
(45) Date of Patent: Nov. 12, 2019

(54) HIGH EFFICIENCY MULTI-LEVEL BUCK-BOOST CONVERTER

(71) Applicant: Dialog Semiconductor (UK) Limited, London (GB)

(72) Inventor: Holger Petersen, Pastetten (DE)

(73) Assignee: Dialog Semiconductor (UK) Limited, London (GB)

(*) Notice: Subject to any disclaimer, the term of this patent is extended or adjusted under 35 U.S.C. 154(b) by 0 days.

(21) Appl. No.: 15/370,681

(22) Filed: Dec. 6, 2016

(65) Prior Publication Data

US 2017/0163157 A1    Jun. 8, 2017

(30) Foreign Application Priority Data

Dec. 7, 2015  (DE) .......................... 10 2015 224 476

(51) Int. Cl.
   *H02M 3/158*   (2006.01)
   *H02M 1/14*    (2006.01)

(52) U.S. Cl.
   CPC ........... *H02M 3/1582* (2013.01); *H02M 1/14* (2013.01)

(58) Field of Classification Search
   CPC ...... H02M 3/156; H02M 3/155; H02M 3/158; H02M 3/145; H02M 2001/0067; H02M 3/157; H02M 3/1563; H02M 3/07; H02M 3/073; H02M 7/10; H02M 7/103; H02M 7/106; G05F 1/618; G05F 1/613; G05F 1/614

USPC .............. 323/222, 224, 225, 265, 266, 271, 323/282–285
   See application file for complete search history.

(56) References Cited

U.S. PATENT DOCUMENTS

| | | | |
|---|---|---|---|
| 7,265,606 B1* | 9/2007 | Suzuki ................. | H03K 17/063 327/390 |
| 2009/0072800 A1* | 3/2009 | Ramadass ............... | H02M 3/07 323/271 |
| 2013/0176076 A1* | 7/2013 | Riehl ..................... | H02M 3/156 330/127 |
| 2014/0070787 A1 | 3/2014 | Amo | |
| 2017/0055322 A1* | 2/2017 | Jiang ....................... | H02M 3/07 |

OTHER PUBLICATIONS

German Office Action, File Number: 10 2015 224 476.8, Applicant: Dialog Semiconductor (UK) Ltd., dated Apr. 8, 2014, 15 pgs, and English language translation, 18 pgs.

(Continued)

*Primary Examiner* — Nguyen Tran
(74) *Attorney, Agent, or Firm* — Saile Ackerman LLC; Stephen B. Ackerman

(57) ABSTRACT

A power converter for converting an input voltage at an input port into an output voltage at an output port of the power converter is described. The power converter comprises an inductor having a first inductor port and a second inductor port, wherein the second inductor port is coupled to the output port. Furthermore, the power converter comprises a flying capacitor having a first capacitor port and a second capacitor port, and a switching cell. In addition, the power converter comprises a control unit to operate the switching cell in a first sequence of operation phases to perform step-up conversion; and in a second sequence of operation phases to perform step-down conversion.

10 Claims, 10 Drawing Sheets

(56) References Cited

OTHER PUBLICATIONS

"Three level buck converter with improved dynamic performance using linear-non linear control," by Reshma, et al, International Journal of Innovative Research in Electrical Electronics, Instrumentation and Control Engineering, vol. 2, Issue 3, Mar. 2014, pp. 1189-1192.
"Switched-Capacitor Converters with Multiphase Interleaving Control," by Sitthisak Kiratipongvoot et al., 2011 IEEE Energy Conversion Congress and Exposition (ECCE), Sep. 17-22, 2011, pp. 1156-1161.
"Three Level Buck Converter for Envelope Tracking Applicaitons," by Vahid Yousefadeh et al., IEEE Transactions on Power Electronics, vol. 21, No. 2, Mar. 2006, pp. 549-552.
"Single-Phase Three-Level Boost Power Factor Correction Converter," by Michael T. Zhang et al., Tenth Annual Applied Power Electronics Conference and Exposition, 1995. APEC '95. Conference Proceedings 1995., Mar. 5-9, 1995, pp. 434-439.
"High-Efficiency, Regulated Charge Pumps for High-Current Applications," by Brigitte Kormann, Texas Instruments, slup17.pdf, Jan. 1, 2002, pp. 1-14.
"Multi-Level Conversion: High Voltage Choppers and Voltage-Source Inverters," by T.A. Meynard et al, 23rd Annual IEEE Power Electronics Specialists Conference, 1992. PESC '92 Record., Jun. 1992, pp. 397-403.
"A Fully-Integrated Switched-Capacitor 2:1 Voltage Converter with Regulation Capability and 90% Efficiency at 2.3A/mm$^2$," by Leland Chang et al., 2010 Symposium on VLSI Circuits/Technical Digest of Technical Papers, Jun. 2010, pp. 55-56.
"Step-Up Switching-Mode Converter With High Voltage Gain Using a Switched-Capacitor Circuit," by Oded Abutbul et al., IEEE Transactions on Circuits and Systems—I: Fundamental Theory and Applications, vol. 50, No. 8, Aug. 2003, pp. 1098-1102.
"A Fully-Integrated 3-Level DC-DC Converter for Nanosecond-Scale DVFS," by Wonyoung Kim et al., IEEE Journal of Solid-State Circuits, vol. 47, No. 1, Jan. 2012, pp. 206-219.
"Design of a Fully Integrated Three-Level Buck Converter," by Y. Neelima et al., International Journal of Engineering Sciences & Research Technology, vol. 3, No. 8, Aug. 30, 2014, pp. 701-704.
"Flying Capacitor Voltage Balancing Method by Sensing Inductor Current," Jan. 1, 2009, Center for Power Electronics Systems Showcase, 1 pg.
"A Hybrid Switched-Capacitor/Inductor Converter for Small Conversion Ratios," by Norah Elena Nakibuuka, Thesis for Master of Engineering in Electrical Engineering and Computer Science Degree, MIT, May 2013, 69 pgs.
Semiconductor Circuit Technology, by Tietze and Schenk, 11th Edition, Copyright 1999, Springer, 3 pgs.

* cited by examiner

600

601
Operating the switching cell S1, S2, S3A, S3B, S4 in a first sequence of operation phases to perform step-up conversion or step-down conversion, respectively 602
Operating the switching cell S1, S2, S3A, S3B, S4 in a second sequence of operation phases to perform step-down conversion or step-up conversion, respectively

HIGH EFFICIENCY MULTI-LEVEL BUCK-BOOST CONVERTER

TECHNICAL FIELD

The present document relates to power converters with regulated output voltage or output current. In particular, the present document relates to switched power converters for battery powered applications.

BACKGROUND

Over the last years battery powered applications (like smartphones and tablet PCs) increased their computing power, screen resolution and display frame rate and added connected standby modes. This caused an increased drain of the battery, so that many modern smartphones need to be re-charged on a daily basis. Limited mobility time may be addressed by using battery packs with an increased capacity, but re-charging such battery packs typically requires an increased amount of time. This is due to the fact that smartphones are typically charged through a standard (Micro) USB port, which provides limited current handling capability (~1.5 A). Therefore a 5 Ah battery pack requires several hours for re-charging, even through the battery technology (typically LiIon/LiPolymer) would allow for increased charging power levels (e.g. 1-2 C charging).

Recent changes in the USB charging specification allow for higher voltages than the standard 5V, enabling up to 4× the power from the USB supply (9V, 12V and 20V). But as smartphones are space and height constrained (especially regarding the inductors used for switching converters) an increasing inductor current ripple (from higher input voltages) cannot be compensated with coils having higher inductance. As a result, either the DCR (DC resistance) of the coil may be increased or the switching frequency may be increased. Both measures lead to an increased dissipation power and may lead to hot spots at the housing of a battery powered application.

SUMMARY

The present document addresses the technical problem of providing an efficient and compact power converter which enables step-up and step-down power conversion (e.g. for battery powered applications). According to an aspect, a power converter for converting an input voltage at an input port of the power converter into an output voltage at an output port of the power converter is described. The input voltage may correspond to the voltage level difference between the input port and ground. The output voltage may correspond to the voltage level difference between the output port and ground.

The power converter comprises an inductor having a first inductor port and a second inductor port. The second inductor port may be coupled (e.g. directly) to the output port. Furthermore, the power converter comprises (at least one) flying capacitor having a first capacitor port and a second capacitor port, as well as at least one switching cell. A switching cell may be configured to modify the arrangement of the corresponding flying capacitor and/or of the inductor within the power converter, e.g. using a plurality of switches. As such, the power converter may be operated in different operation phases, wherein a particular operation phase typically comprises or corresponds to a particular configuration of the switching cell.

The switching cell comprises a first switch which is configured to couple the first capacitor port (e.g. directly) to the input port. Furthermore, the switching cell comprises a second switch which is configured to couple the first capacitor port (e.g. directly) to the first inductor port. In addition, the switching cell comprises a third switch configured to couple the second capacitor port (e.g. directly) to the first inductor port. Furthermore, the switching cell comprises a fourth switch configured to couple the second capacitor port (e.g. directly) to ground. The first, second, third and fourth switch may be used to configure the power converter for step-down (i.e. Buck) conversion.

The switching cell further comprises an auxiliary switch configured to couple the second capacitor port to the input port. The auxiliary switch may be used to configure the power converter for step-up (i.e. Boost) conversion.

In addition, the power converter comprises a control unit, such as shown in FIG. 7, which is configured to operate the switching cell in a first sequence of operation phases to provide a step-up conversion (with the output voltage being higher than the input voltage). The first sequence of operation phases typically involves switching of the auxiliary switch. Furthermore, the control unit is configured to operate the switching cell in a second sequence of operation phases to provide a step-down conversion (with the output voltage being lower than the input voltage). The second sequence of operation phases typically does not involve switching of the auxiliary switch. In particular, the auxiliary switch may be maintained open by the control unit during all the operation phases of the second sequence of operation phases. As such, step-down conversion may not be affected substantially by the auxiliary switch. There may be a minor side effect from drain-source capacitance of the auxiliary switch, which may increase transition loss when closing the first switch, but this side effect typically does not reduce the conversion efficiency noticeably.

As such, a power converter is described which enables a power efficient step-up and step-down conversion with a limited number of switches (e.g. metal oxide semiconductor transistors). In particular, a Buck-based power converter is provided which enables step-up conversion using only a single additional (auxiliary) switch.

The first sequence of operation phases and the second sequence of operation phases typically each comprise two or more operation phases (with a different combination of configurations of the switches of the switching cell). During an (e.g. during each) operation phase one of more of the switches of the switching cell are closed and one of more of the switches of the switching cell are open. The two or more operation phases of the first sequence of operation phases and two or more operation phases of the second sequence of operation phases are typically such that they only comprise serial arrangements of two or less closed switches of the switches from the switching cell. As such, the power converter may be operated in a power-efficient manner (with relatively low losses caused by the on-resistances of the switches).

The control unit may be configured to adapt the duration of the two or more operation phases of the first sequence of operation phases and/or of the second sequence of operation phases, in accordance to a target conversion ratio between the input voltage and the output voltage. In particular, a duty cycle of the first and/or second sequences of operation phases may be adapted. Furthermore, the control unit may be configured to adapt the first sequence of operation phases and/or the second sequence of operation phases, such that the output voltage is regulated to a pre-determined target voltage. As such, the power converter may be configured to provide stable output voltages at different target voltage levels.

The first sequence of operation phases (for step-up conversion) may comprise a magnetization phase, during which the auxiliary switch is closed. During the magnetization phase, the second switch may be closed, and the first switch, the third switch and the fourth switch may be open (as shown e.g. in FIG. 4A).

Furthermore, the first sequence of operation phases may comprise a demagnetization phase, during which the auxiliary switch is open. Different variants of the demagnetization phase may be provided to provide different conversion ratios. One or more of these variants may be used within the first sequence of operation phases. During a first variant of the demagnetization phase, the first switch, the second switch and the fourth switch are closed, and the third switch is open (as shown e.g. in FIG. 4B). During a second variant of the demagnetization phase, the second switch and the fourth switch are closed, and the first switch and the third switch are open (as shown e.g. in FIG. 4D). During a third variant of the demagnetization phase, the first switch, the third switch and the fourth switch are closed, and the second switch is open (as shown e.g. in FIG. 4C).

The magnetization phase and the demagnetization phase may be repeated in a periodic manner (at a certain commutation cycle rate), thereby providing the power conversion from the input port to the output port of the switched-mode power converter. In particular, the magnetization phase and the first variant of the demagnetization phase may be repeated in a periodic manner. Optionally, the third variant of the demagnetization phase may be used instead of or in series with the first variant of the demagnetization phase. According to another sequence of operation phases, the second variant may follow by the magnetization phase before passing to the first variant or the third variant (notably in case of boost ratios that a substantially smaller than 2), and so on.

The second sequence of operation phases (for step-down conversion) may comprise a first operation phase during which the first switch and the third switch are closed and during which the second switch and the fourth switch are open (as shown e.g. in FIG. 3A). Furthermore, the second sequence of operation phases may comprise a second operation phase during which the first switch and the third switch are open and during which the second switch and the fourth switch are closed (as shown e.g. in FIG. 3B). The first operation phase and the second operation phase may be repeated in a periodic manner, thereby providing the power conversion from the input port to the output port of the switched-mode power converter.

The second sequence of operation phases may comprise further operation phases, e.g. a third operation phase during which the first switch and the second switch are closed and during which the third switch and the fourth switch are open (as shown e.g. in FIG. 3C), and/or a fourth operation phase during which the first switch and the second switch are open and during which the third switch and the fourth switch are closed (as shown e.g. in FIG. 3D). At least one of the third operation phase and the fourth operation phase may be used one or twice per cycle (with a duty cycle depending on the Vout/Vin ratio).

Furthermore, the second sequence of operation phases may comprise a fifth operation phase, during which the first switch, the second switch and the third switch are open (as shown e.g. in FIG. 3E). The fifth operation phase may be an idle operation phase. During an idle operation phase as e.g. shown in FIG. 3E it is sufficient that maximum one contact of the flying capacitor and the inductor are connected to either GND, to the input port Vin or to the output port Vout (in order to prohibit any current flow besides the current flowing from the output capacitor Cout to the output Vout). The fifth operation phase may be inserted to reduce switching losses.

The power converter may further comprise an interleaving flying capacitor having a first interleaving capacitor port and a second interleaving capacitor port, as well as an interleaving switching cell for modifying the arrangement of the interleaving flying capacitor within the power converter. The control unit may be configured to operate the switching cell and the interleaving switching cell in an interleaved manner (e.g. at a phase difference of 180 degrees), thereby reducing the current ripple of the power converter (as shown e.g. in FIG. 2A).

In a similar manner to the switching cell, the interleaving switching cell may comprise: a first interleaving switch configured to couple the first interleaving capacitor port (e.g. directly) to the input port; a second interleaving switch configured to couple the first interleaving capacitor port (e.g. directly) to the first inductor port; a third interleaving switch configured to couple the second interleaving capacitor port (e.g. directly) to the first inductor port; and a fourth interleaving switch configured to couple the second interleaving capacitor port (e.g. directly) to ground. Using these switches, current ripple reduction may be provided during step-down conversion.

Furthermore, the interleaving switching cell may comprise an auxiliary interleaving switch configured to couple the second interleaving capacitor port (e.g. directly) to the input port. Using the auxiliary interleaving switch, current ripple reduction may be provided during step-up conversion.

In particular, the control unit may be configured to operate the interleaving switching cell in a first sequence of synchronous operation phases to perform step-up conversion. In particular, the interleaved switching cell may be operated in sync with the switching cell, thereby enabling increased output currents. Even during such synchronous operation, ripple is reduced compared to an inductive step-up converter by providing current to the output during both inductor magnetizing and demagnetizing phases. Furthermore, the control unit may be configured to operate the interleaving switching cell in a second sequence of interleaved operation phases to perform step-down conversion. As a result of this, current ripple reduction may be performed during step-down conversion.

The power converter may further comprise an output capacitor arranged in parallel between the output port and ground, thereby further reducing current ripple.

According to a further aspect, a power converter for converting an input voltage at an input port into an output voltage at an output port of the power converter is described. The power converter comprises an arrangement which is inverted or mirrored compared to the power converter described above. The power converter may be viewed as a multi-level step-up (i.e. Boost) power converter with additional step-down conversion capability (provided by an auxiliary switch). The features which are described for the above mentioned power converter are applicable in an analogous (i.e. mirrored) manner to the power converter which is described below. In particular, the features are applicable by exchange the input port and the output port.

An example for the use of a boost converter with buck capability, i.e. for the below operation of a power converter, is the reverse provision of power from a 2S battery pack back into the charger port as e.g. specified for USB OTG (On The Go). Adding step-down capability to a reverse boost mode of a DCDC USB charger enables e.g. the provision of 5V from 2S battery pack.

The power converter comprises an inductor having a first inductor port and a second inductor port. The first inductor port may be coupled (e.g. directly) to the input port. Furthermore, the power converter comprises a flying capacitor having a first capacitor port and a second capacitor port, as well as a switching cell.

The switching cell comprises a first switch configured to couple the first capacitor port (e.g. directly) to the output port; a second switch configured to couple the first capacitor port (e.g. directly) to the second inductor port; a third switch configured to couple the second capacitor port (e.g. directly) to the second inductor port; a fourth switch configured to couple the second capacitor port (e.g. directly) to ground; and an auxiliary switch configured to couple the second capacitor port (e.g. directly) to the output port.

In addition, the power converter comprises a control unit configured to operate the switching cell in a first sequence of operation phases to perform step-down conversion (using the auxiliary switch). The control unit is further configured to operate the switching cell in a second sequence of operation phases to perform step-up conversion (without using the auxiliary switch, notably while maintaining the auxiliary switch open).

According to a further aspect, a power converter for converting an input voltage at an input port into an output voltage at an output port of the power converter is described. In particular, the power converter is directed at inverting the output voltage with respect to the input voltage. The power converter comprises an inductor having a first inductor port and a second inductor port, wherein the second inductor port is coupled to ground. Furthermore, the power converter comprises a flying capacitor having a first capacitor port and a second capacitor port.

In addition, the power converter comprises a switching cell, wherein the switching cell comprises a first switch configured to couple the first capacitor port to the input port; a second switch configured to couple the second capacitor port to the output port; a third switch configured to couple the second capacitor port to the first inductor port; and a fourth switch configured to couple the first capacitor port to the first inductor port.

Furthermore, the power converter comprises a control unit configured to operate the switching cell in a sequence of operation phases to perform inversion with an absolute conversion ratio greater than one or with an absolute conversion ratio smaller than one. The sequence of operation phases may comprises the operation phases illustrated in FIGS. 5A and 5B. By changing the duty cycle of the operation phases of FIG. 5A and FIG. 5B, the absolute conversion ratio may be changed. Furthermore, one or more additional operation phases (notably the operation phases of FIGS. 5C and 5D) may be used to enable regulation with respect to a target output current or a target output voltage (especially when the absolute output voltage/current is increasing (FIG. 5D) or decreasing (FIG. 5C). Furthermore, an operation phase as illustrated in FIG. 5E may be inserted to reduce switching losses (in case of relatively low output currents).

According to another aspect, a method is described for operating one of the above mentioned power converters comprising a switching cell. The method comprises operating the switching cell in a first sequence of operation phases to perform step-up conversion or step-down conversion or inversion with an absolute conversion ratio smaller than one, respectively. The method further comprises operating the switching cell in a second sequence of operation phases to perform step-down conversion or step-up conversion or inversion with an absolute conversion ratio smaller than one, respectively.

In the present document, the term "couple" or "coupled" refers to elements being in electrical communication with each other, whether directly connected e.g., via wires, or in some other manner.

BRIEF DESCRIPTION OF THE DRAWINGS

The invention is explained below in an exemplary manner with reference to the accompanying drawings, wherein.

DESCRIPTION

As outlined above, the present document is directed at providing a size- and energy-efficient power converter for step-up and step-down power converter, e.g. for battery powered applications. Capacitive multi-level power converters make use of one or more flying capacitors for providing step-up or step-down conversion. However, a multi-level Buck converter does not support a conversion where the input voltage is lower than the output voltage (to be coupled e.g. to a battery pack). Such a situation may occur, e.g. when a battery pack is built from at least 2 Lilon/LiPolymer cells being connected in series (2S, 3S, ... ), wherein the battery pack needs to be charged from a legacy USB port providing only a voltage of 5V.

DC/DC power converters that provide step-down as well as step-up conversion may be referred to as Buck-Boost power converters. Such power converters may be obtained by combing the switching cell of a Buck converter with the switching cell of a Boost converter, with both switching cells sharing a common inductor L. While such an arrangement allows for a flexible step-up and/or step-down conversion, such an arrangement is inefficient with regards to the number of required switches (i.e. with regards to the required space) and with regards to the number of switches that are arranged in series (i.e. with regards to the power consumption), especially when Vout/Vin is >2 or is <½.

Figure 1:
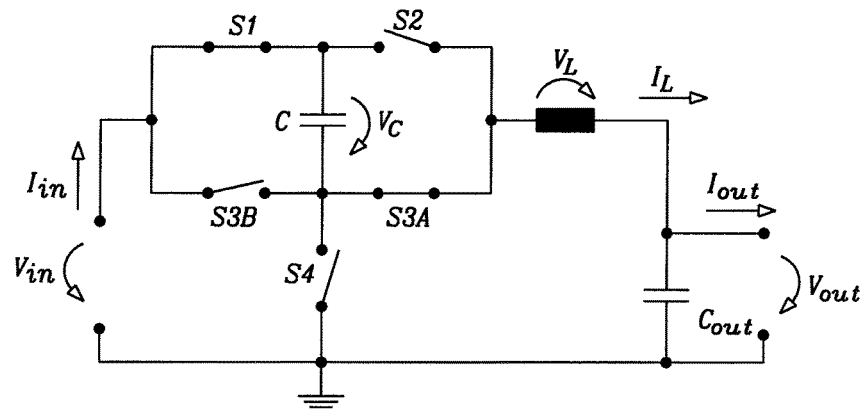
FIG. 1 shows a circuit diagram of an example multi-level Buck-Boost power converter.

In the present document an efficient multi-level step-down power converter is described which also supports step-up conversion (e.g. output voltages $V_{out}<(n-1) \times V_{in}$ when using an n-level power converter) and/or an efficient multi-level step-up power converter is described, which also supports step-down conversion. The described power converters have a reduced sized compared to a power converter which is cascading a multi-level Buck converter with a multi-level Boost converter via a common inductor. Furthermore, the described power converters provide high power efficiency as the power converters arrange a maximum of only two switches in series. FIG. 1 shows an example three level Buck-Boost power converter. The power converter comprises a first switch S1 which is configured to couple a first capacitor port of the flying capacitor C to the input port of the power converter, a second switch S2 which is configured to couple the first capacitor port of the flying capacitor C to the inductor L, a third switch S3A which is configured to couple a second capacitor port of the flying capacitor C to the inductor L, a fourth switch S4 which is configured to couple the second capacitor port of the flying capacitor C to ground, and an auxiliary switch S3B which is configured to couple the second auxiliary port of the flying capacitor C to the input port. The switches S1, S3, S3A, S3B and S4 may form a switching cell. The inductor L may couple the switching cell to the output port of the power converter.

Figure 3A:
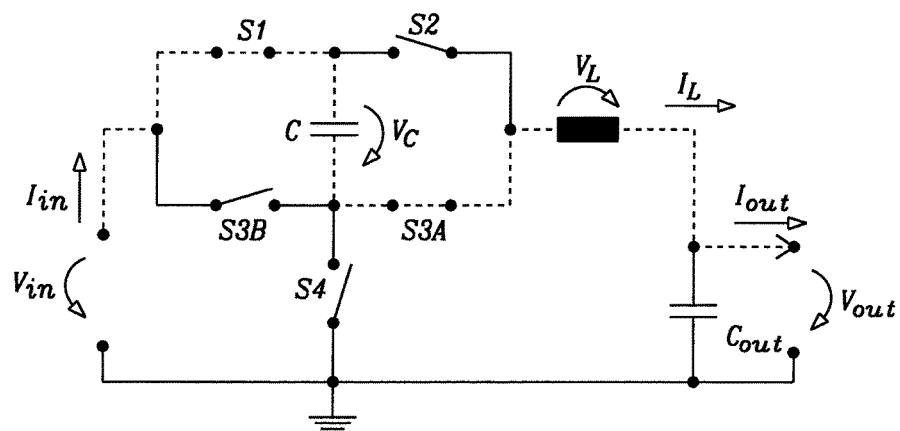
FIGS. 3A, 3B, 3C, 3D and 3E show example operation phases of the power converter of FIG. 1 (for step-down conversion)
Figure 3B:
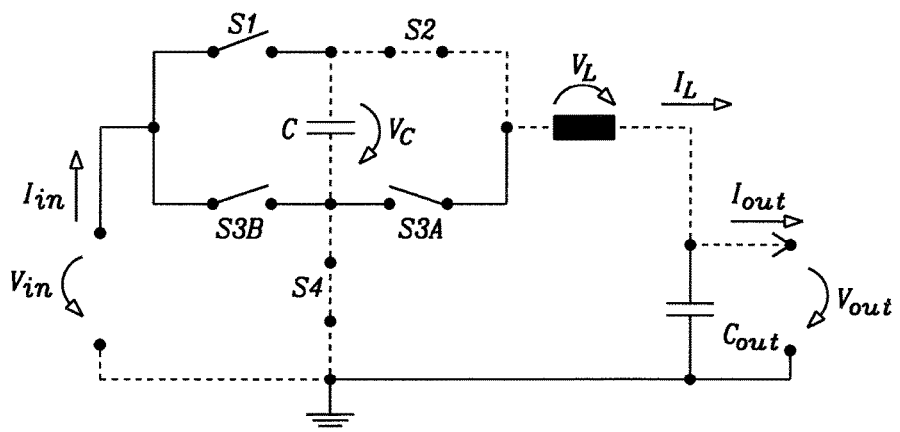
Figure 3C:
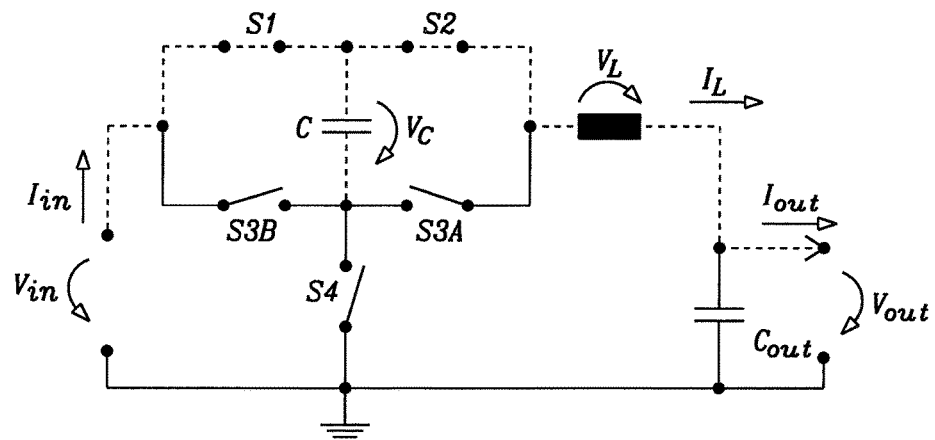

When the auxiliary switch S3B is maintained open, the power converter of FIG. 1 operates as a 3-level Buck power converter, going through a sequence of operation phases shown in FIGS. 3A, 3B and 3C. In particular, the operation phase of FIG. 3A may be followed by the operation phase of FIG. 3C, which may be followed by the operation phase of FIG. 3B, which may be followed by the operation phase of FIG. 3C, before starting all over again. As a result of such a sequence of operation phases, an output voltage $V_{out}$ may be generated which is greater than 0.5 times the input voltage $V_{in}$ (and smaller than the input voltage $V_{in}$). In the above mentioned sequence of operation phases, one of the two operation phases according to FIG. 3C may be skipped.

Figure 3D:
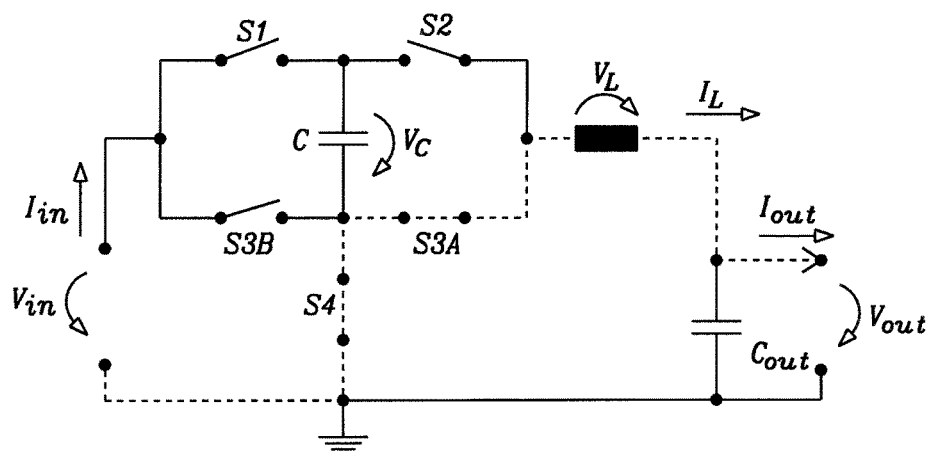
Figure 3E:
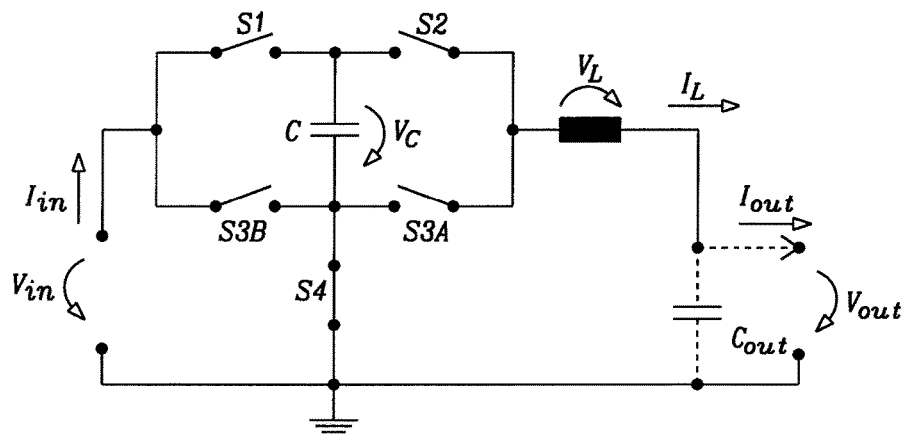

For generating an voltage $V_{out}$ which is smaller than 0.5 times the input voltage $V_{in}$, the following sequence of operation phases may be used: operation phase of FIG. 3A is followed by operation phase of 3D, which is followed by the operation phase of FIG. 3B, which is followed by the operation phase of FIG. 3D, before starting all over again. One of the two operation phases according to FIG. 3D may be skipped. In case of low output current an idle state or idle operation phase as shown in FIG. 3E may be inserted into the sequences of operation phases, in order to reduce switching loss. It can be seen from FIGS. 3A, 3B, 3C, 3D and 3E that the auxiliary switch S3B is maintained open for step-down conversion, therefore not affecting the power efficiency of the power converter, when being operated as a step-down power converter.

Figure 4A:
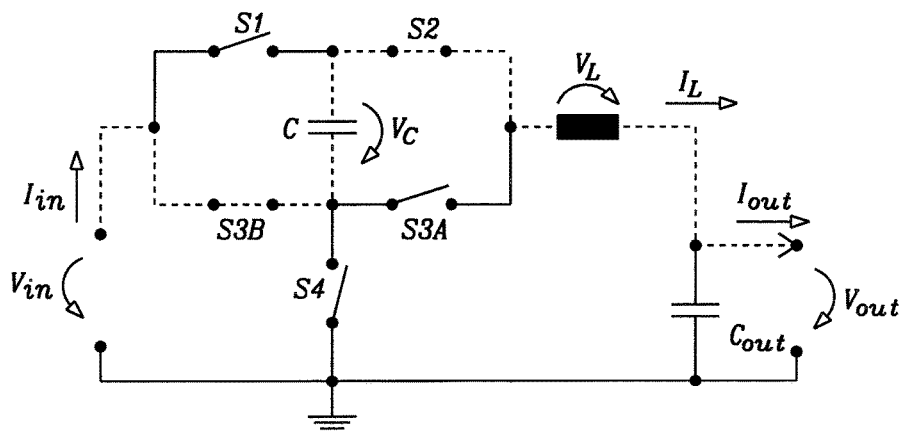
FIGS. 4A, 4B, 4C and 4D show example operation phases of the power converter of FIG. 1 (for step-up conversion)
Figure 4B:
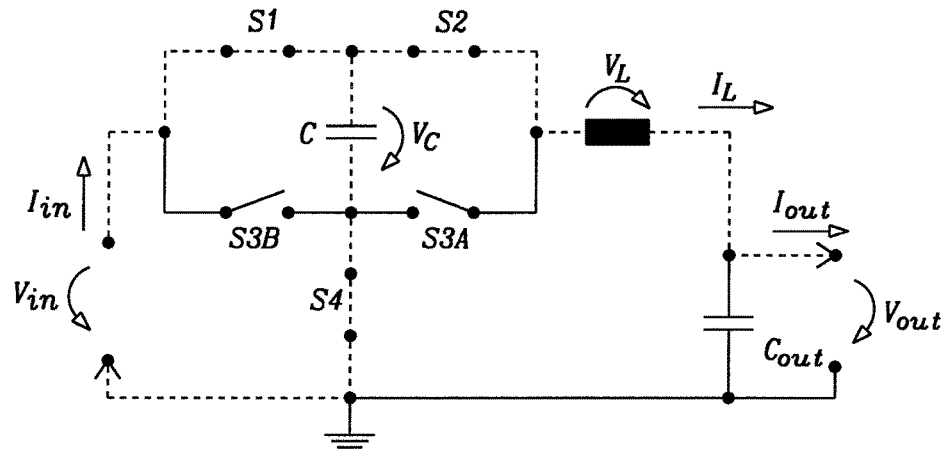

On the other hand, the auxiliary switch S3B may be used for providing a step-up power converter (i.e. a Boost power converter) with a maximum conversion ratio $V_{out}/V_{in} < 2$. FIGS. 4A and 4B show example operation phases for providing step-up conversion. In particular, the power converter may toggle between the operation phase of FIG. 4A and the operation phase of FIG. 4B to achieve step-up conversion up to $V_{out}/V_{in} < 2$. During the operation phase of FIG. 4B, the flying capacitor C is arranged in parallel to the input of the power converter, thereby charging the flying capacitor C to a possible maximum of $V_c = V_{in}$. As a result of this, an increased virtual input voltage (being the sum of $V_{in}$ and $V_c$) is provided during the operation phase of FIG. 4B, thereby enabling step-up conversion.

Figure 4C:
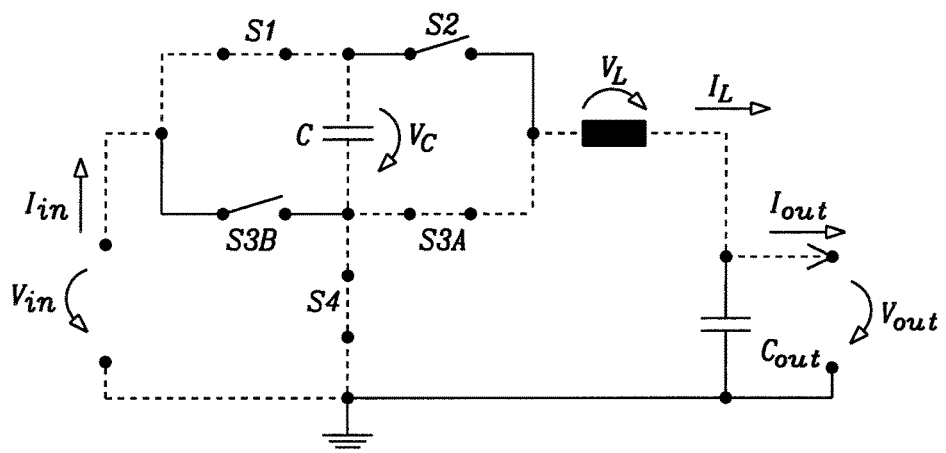
Figure 4D:
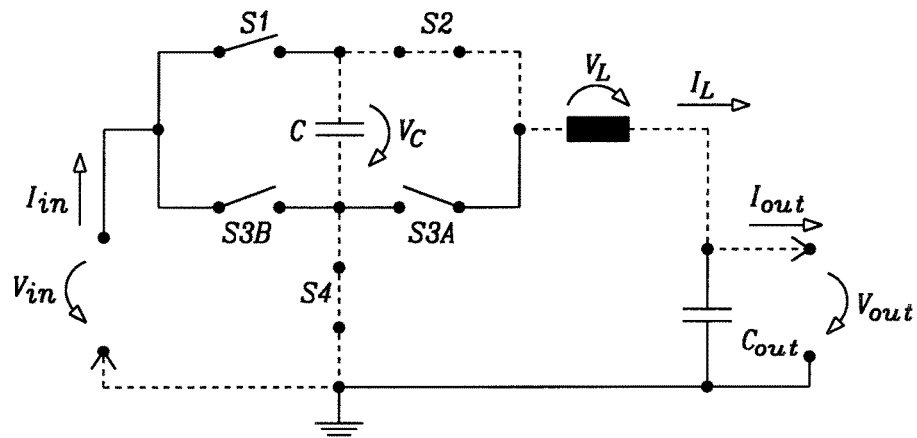

In case of a boost ratio $V_{out}/V_{in} < 1.5$, a state or operation phase as the one shown in FIG. 4D may be used to demagnetize the inductor L even during the capacitor discharging phase. Faster demagnetizing of the inductor L may also be achieved by using the third switch S3A in a state or operation phase as the one shown in FIG. 4C.

Figure 2A:
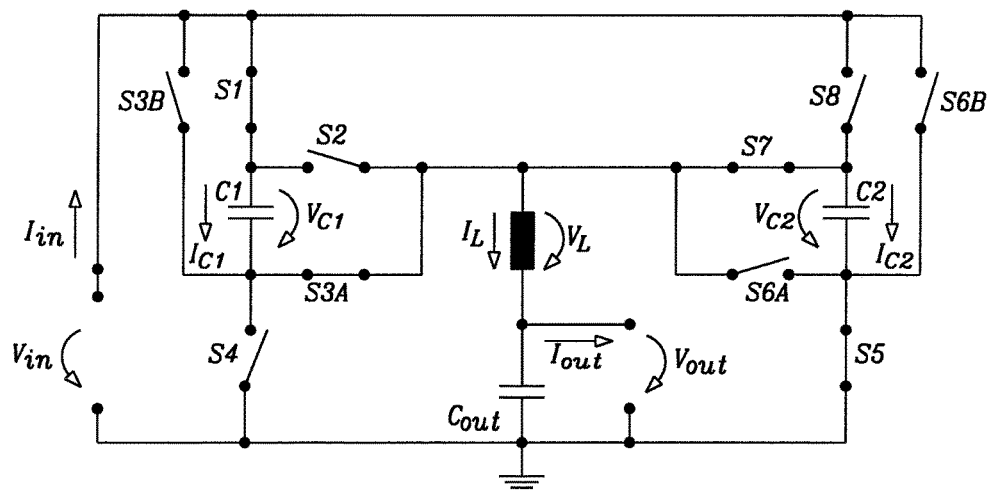
FIG. 2A shows a circuit diagram of an example interleaved multi-level Buck-Boost power converter.

A push-pull topology with current ripple cancellation may be applied to the 3-level p Buck-Boost power converter of FIG. 1 by adding an interleaving switching cell (comprising the switches S5, S6A, S6B, S7, S8) and an interleaving flying capacitor C2 (see FIG. 2A). The interleaving switching cell may be operated in the same manner as the first or main switching cell (comprising the switches S1, S2, S3A, S3B, S4). However, (for step-down conversion) the main switching cell may be operated in an interleaved manner (e.g. with a 180 degrees phase shift) compared to the interleaving switching cell, thereby cancelling or reducing current ripple. It should be noted that for reduced output current in boost mode the interleaving switching cell may be provided without the interleaving auxiliary switch S6B. Otherwise both switching cells would need to be operated synchronously in boost mode.

The auxiliary switch S3B (and S6B) may be individually scaled according to the efficiency (maximum conversion dissipation power) needs during boost mode.

Figure 2B:
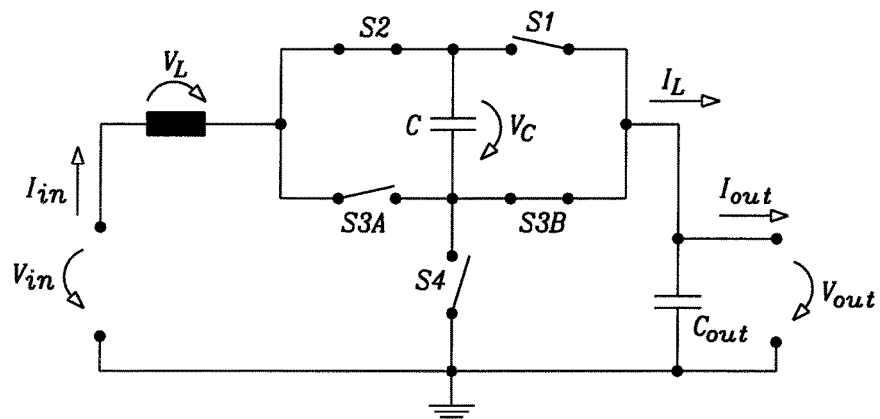
FIG. 2B shows a circuit diagram of an example power converter with an inverted topology compared to the power converter of FIG. 1.

FIG. 2B shows an inverted topology of the power converter of FIG. 1. The power converter of FIG. 2B may be viewed as a 3 level step-up power converter with an auxiliary switch S3B enabling step-down conversion (with $V_c$ at the flying capacitor being approximately equal to the output voltage $V_{out}$). The efficiency of the step-up converter is not affected by the auxiliary switch S3B. Output ripple reduction may be provided by using an interleaving second flying capacitor in an analogous configuration as shown in FIG. 2A.

Figure 2C:
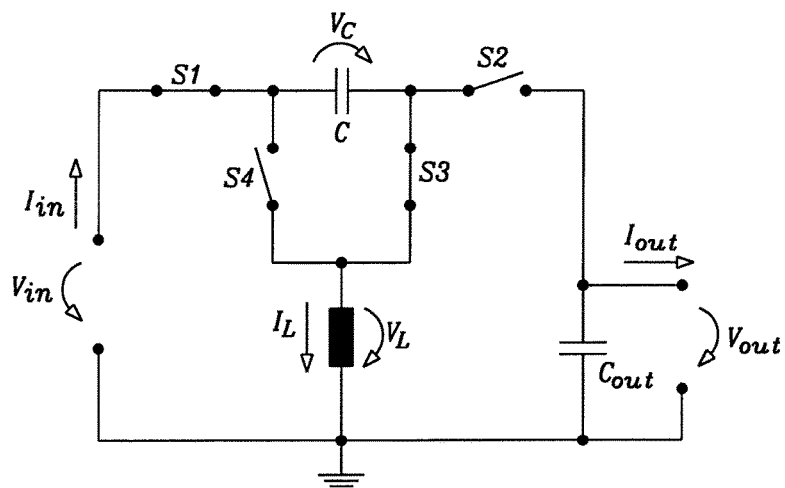
FIG. 2C shows a circuit diagram of an example inverter, i.e. an inverting Buck-Boost converter.

FIG. 2C shows an example inverter, i.e. an inverting DC/DC converter with (absolute) step-up and step-down capability. FIGS. 5A, 5B, 5C, 5D and 5E show example operation phases for the inverter of FIG. 2C.

By complementary switching of the first switch S1 together with the switch S3, and S2 together with the switch S4, the inverter of FIG. 2C operates as an inverting buck-boost converter with improved efficiency at conversion ratios $V_{out}/V_{in} = -\frac{1}{2}$ or $-2$ (on top of $V_{out}/V_{in} = -1$). In particular, the operation phases of FIGS. 5A and 5B may be repeated in a periodic manner, thereby providing a default sequence of operation phases. By changing the duty cycles of the different operation phases, the conversion ratio may be adapted. As such, the inverter of FIG. 2C allows inversion with flexible (absolute) conversion ratios.

Figure 5A:
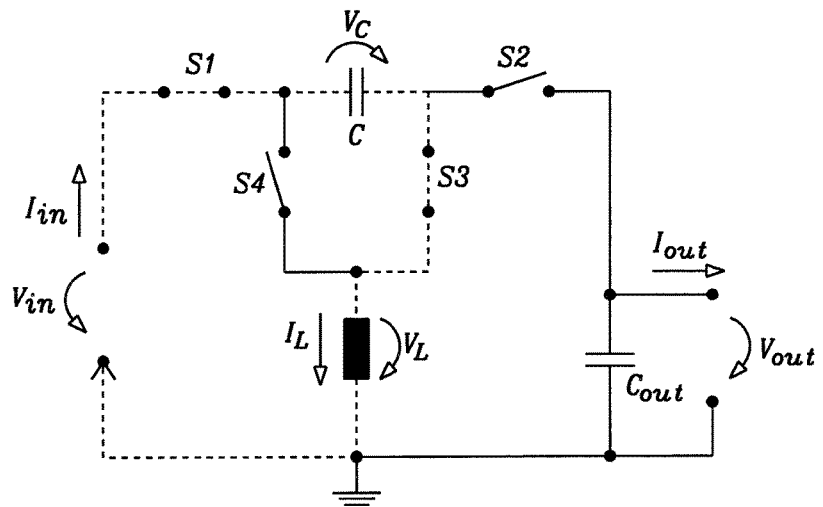
FIGS. 5A, 5B, 5C, 5D and 5E show example operation phases of the power converter, i.e. inverter, of FIG. 2C.
Figure 5B:
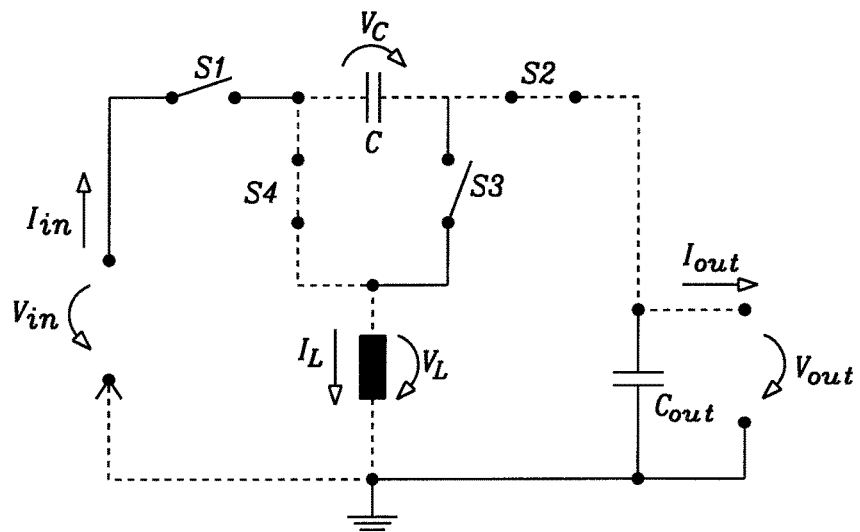
Figure 5C:
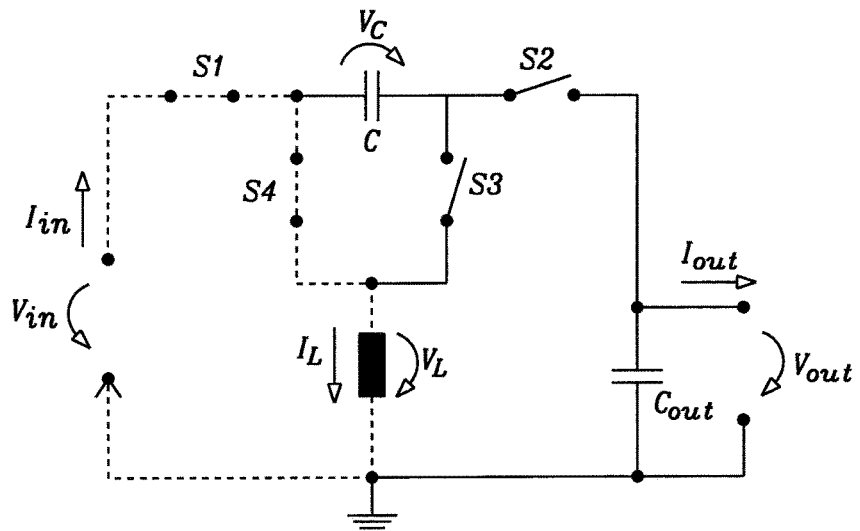
Figure 5D:
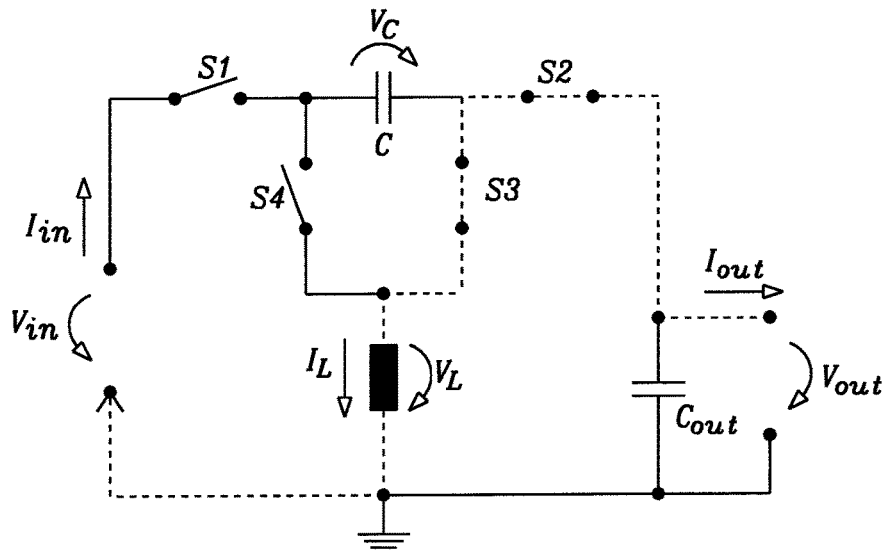

For increasing the (absolute) output voltage and/or current an additional magnetizing phase may be inserted once (or twice) within a complete switching cycle (as shown in FIG. 5C). Demagnetizing for (absolute) output voltage and/or current down regulation may be achieved by inserting an operation phase as shown in FIG. 5D (instead of the operation phase of FIG. 5C). The phases of FIG. 5C and FIG. 5D may be used to regulate the voltage and/or current at the output of the power converter.

Figure 5E:
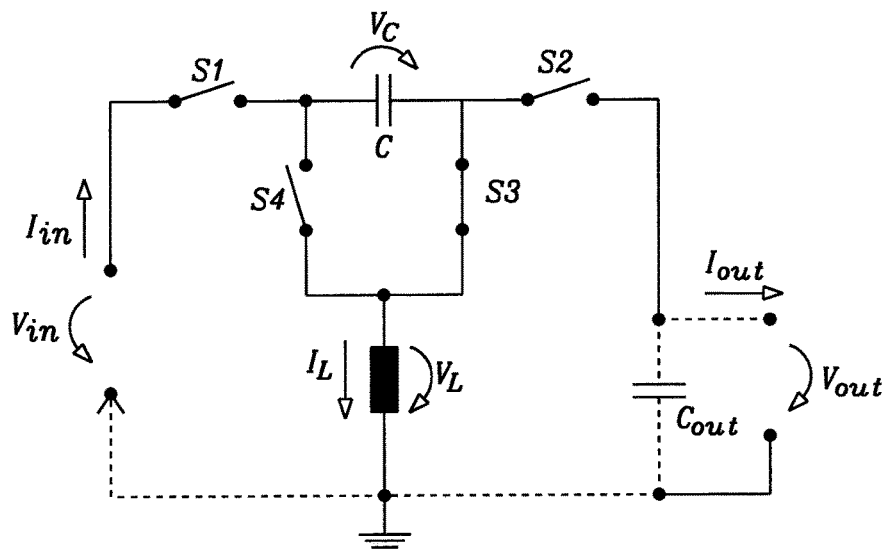

In case of low output current an idle state as shown in FIG. 5E may be inserted in the first or second sequence of operation phases to reduce switching loss.

It should be noted that the buck-boost switching topology shown in the present document (notably in FIGS. 1, 2B and 2C) is not limited to 3 level conversion, but may be extended in a similar manner to other (capacitor-based) multi-level power converters.

Figure 6:
FIG. 6 shows a flow chart of an example method for converting an input voltage into an output voltage.
Figure 7:
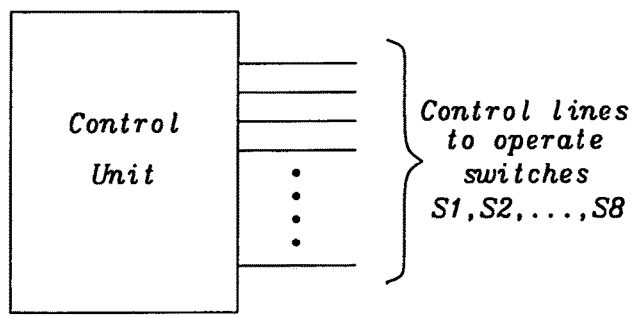
FIG. 7 shows a control unit which operates switches S1, S2, ... S8.

FIG. 6 shows a flow chart of an example method 600 for converting an input voltage at an input port into an output voltage at an output port of a power converter. The input voltage corresponds to the voltage between the input port and ground, and the output voltage corresponds to the voltage between the output port and ground.

The power converter comprises an inductor having a first inductor port and a second inductor port, wherein the second inductor port is (e.g. directly) coupled to the output port (as illustrated in FIG. 1). Furthermore, the power converter comprises a flying capacitor C having a first capacitor port and a second capacitor port. In addition, the power converter comprises a switching cell S1, S2, S3A, S3B, S4 for modifying the arrangement of the flying capacitor C. The switching cell S1, S2, S3A, S3B, S4 may comprise: a first switch S1 configured to couple the first capacitor port (e.g. directly) to the input port; a second switch S2 configured to couple the first capacitor port (e.g. directly) to the first inductor port; a third switch S3A configured to couple the second capacitor port (e.g. directly) to the first inductor port; a fourth switch S4 configured to couple the second capacitor port (e.g. directly) to ground; and/or an auxiliary switch S3B configured to couple the second capacitor port (e.g. directly) to the input port. As such, the power converter may be arranged as shown in FIG. 1.

Alternatively or in addition, the power converter may comprise an inductor having a first inductor port and a second inductor port, wherein the first inductor port is coupled to the input port (as shown in FIG. 2B). Furthermore, the power converter may comprise a flying capacitor C having a first capacitor port and a second capacitor port, and a switching cell S1, S2, S3A, S3B, S4. The switching cell S1, S2, S3A, S3B, S4 comprises: a first switch S1 configured to couple the first capacitor port (e.g. directly) to the output port; a second switch S2 configured to couple the first capacitor port (e.g. directly) to the second inductor port; a third switch S3A configured to couple the second capacitor port (e.g. directly) to the second inductor port; a fourth switch S4 configured to couple the second capacitor port (e.g. directly) to ground; and/or an auxiliary switch S3B configured to couple the second capacitor port (e.g. directly) to the output port. As such, the power converter may be arranged as shown in FIG. 2B.

The method 600 comprises operating 601 the switching cell S1, S2, S3A, S3B, S4 in a first sequence of operation phases to perform step-up conversion or step-down conversion, respectively. Furthermore, the method 600 comprises operating 602 the switching cell S1, S2, S3A, S3B, S4 in a second sequence of operation phases to perform step-down conversion or step-up conversion, respectively.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A power converter for converting an input voltage at an input port into an output voltage at an output port of the power converter, the power converter comprising,
    an inductor having a first inductor port and a second inductor port; wherein the second inductor port is coupled to the output port;
    a flying capacitor having a first capacitor port and a second capacitor port;
    a switching cell; wherein the switching cell comprises
        a first switch configured to connect the first capacitor port to the input port;
        a second switch configured to connect the first capacitor port to the first inductor port;
        a third switch configured to connect the second capacitor port to the first inductor port;
        a fourth switch configured to connect the second capacitor port to ground; and
        an auxiliary switch configured to connect the second capacitor port to the input port; and
    a control unit configured to operate the switching cell in
        a first sequence of operation phases to perform a step-up conversion; and
        a second sequence of operation phases to perform a step-down conversion, wherein the auxiliary switch is maintained open during all the operation phases of the second sequence of operation phases; and wherein the second sequence of operation phases comprises,
            a first operation phase during which the first switch and the third switch are closed and during which the second switch and the fourth switch are open; and
            a second operation phase during which the first switch and the third switch are open and during which the second switch and the fourth switch are closed.

2. The power converter of claim 1, wherein
    the first sequence of operation phases and the second sequence of operation phases each comprise two or more operation phases;
    during an operation phase one of more of the switches of the switching cell are closed and one of more of the switches of the switching cell are open; and
    the two or more operation phases of the first sequence of operation phases and of the second sequence of operation phases only comprise serial arrangements of two or less closed switches.

3. The power converter of claim 2, wherein the control unit is configured to adapt a duration of the two or more operation phases of the first sequence of operation phases and/or of the second sequence of operation phases in accordance to a target conversion ratio between the input voltage and the output voltage.

4. The power converter of claim 1, wherein the control unit is configured to adapt the first sequence of operation phases and/or the second sequence of operation phases, such that the output voltage is regulated to a pre-determined target voltage.

5. The power converter of claim 1, wherein
    the first sequence of operation phases comprises a magnetization phase, during which the auxiliary switch is closed;
    the first sequence of operation phases comprises a demagnetization phase, during which the auxiliary switch is open; and
    the magnetization phase and the demagnetization phase are repeated in a periodic manner.

6. The power converter of claim 5, wherein during the magnetization phase, the second switch is closed; and the first switch, the third switch and the fourth switch are open.

7. The power converter of claim 5, wherein during the demagnetization phase,
    the first switch, the second switch and the fourth switch are closed; and the third switch is open; or the second switch and the fourth switch are closed; and the first switch and the third switch are open; or
the first switch, the third switch and the fourth switch are closed; and the second switch is open.

8. The power converter of claim 1, wherein the second sequence of operation phases further comprises,
a third operation phase during which the first switch and the second switch are closed and during which the third switch and the fourth switch are open; and/or
a fourth operation phase during which the first switch and the second switch are open and during which the third switch and the fourth switch are closed.

9. The power converter of claim 1, wherein the power converter further comprises an output capacitor arranged in parallel between the output port and ground.

10. A method for converting an input voltage at an input port into an output voltage at an output port of a power converter, wherein
the power converter comprises,
an inductor having a first inductor port and a second inductor port; wherein the second inductor port is coupled to the output port;
a flying capacitor having a first capacitor port and a second capacitor port; and
a switching cell;
the switching cell comprises
a first switch to connect the first capacitor port to the input port;
a second switch to connect the first capacitor port to the first inductor port;
a third switch to connect the second capacitor port to the first inductor port;
a fourth switch to connect the second capacitor port to ground; and
an auxiliary switch to connect the second capacitor port to the input port; and
the method comprises
operating the switching cell in a first sequence of operation phases to perform a step-up conversion; and
operating the switching cell in a second sequence of operation phases to perform a step-down conversion, wherein the auxiliary switch is maintained open during all the operation phases of the second sequence of operation phases; and wherein operating the switching cell in the second sequence of operation phases comprises,
providing a first operation phase during which the first switch and the third switch are closed and during which the second switch and the fourth switch are open; and
providing a second operation phase during which the first switch and the third switch are open and during which the second switch and the fourth switch are closed.

* * * * *